US006312299B1

(12) United States Patent
Henmi

(10) Patent No.: US 6,312,299 B1
(45) Date of Patent: Nov. 6, 2001

(54) INDUCTION SYSTEM FOR WATERCRAFT ENGINE

(75) Inventor: Yasuhiko Henmi, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/459,222

(22) Filed: Dec. 10, 1999

(30) Foreign Application Priority Data

Dec. 10, 1998 (JP) .................................................. 10-351851

(51) Int. Cl.$^7$ ...................................................... B63H 21/38
(52) U.S. Cl. ............................................. 440/88; 181/229
(58) Field of Search ........................ 440/88; 123/184.46, 123/184.21, 184.32, 184.39; 181/229

(56) References Cited

U.S. PATENT DOCUMENTS

| 5,340,344 | 8/1994 | Mineo et al. | 440/88 |
| 5,908,337 | * 6/1999 | Mashiko | 440/88 |
| 5,957,072 | 9/1999 | Hattori | 114/55.57 |
| 6,112,685 | * 9/2000 | Matsuda et al. | 114/55.53 |

FOREIGN PATENT DOCUMENTS

| 7-332183 | * 12/1995 | (JP) . |
| 9-301271 | * 11/1997 | (JP) . |

OTHER PUBLICATIONS

See Doo Bombardier, *Catalogue de pieces*Parts Catalog in Eight (8) pages.

* cited by examiner

*Primary Examiner*—Sherman Basinger
(74) *Attorney, Agent, or Firm*—Knobbe, Martens, Olson, & Bear, LLP

(57) ABSTRACT

An induction system employed in an engine of a small watercraft includes the first intake chamber communicating with the combustion chambers within the engine and a second intake chamber communicating with the first intake chamber. At least one auxiliary air aperture is provided in the first intake chamber so as to allow an auxiliary flow of air into the first intake chamber during, for example, sudden acceleration.

29 Claims, 16 Drawing Sheets

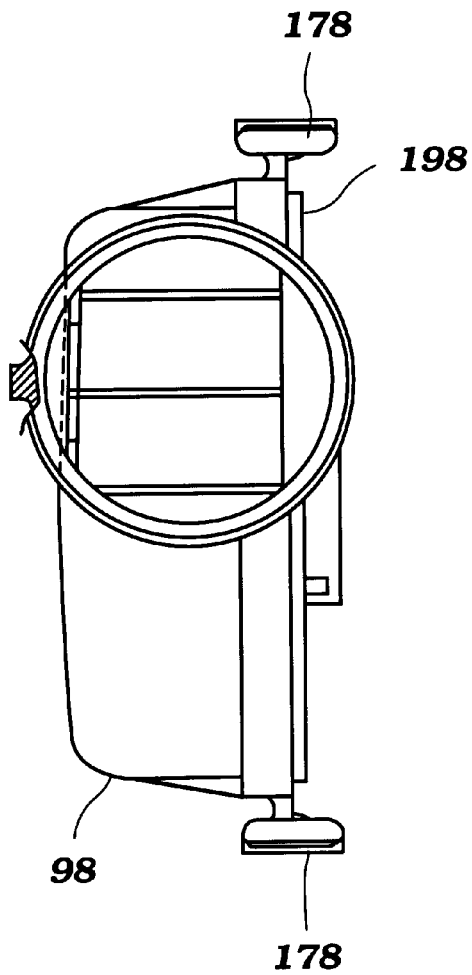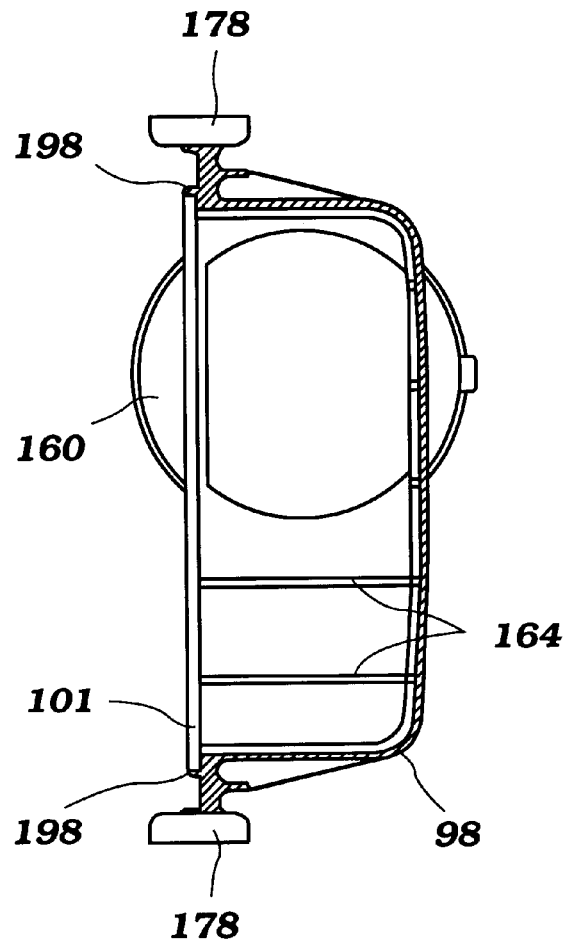
Figure 17
Figure 18

INDUCTION SYSTEM FOR WATERCRAFT ENGINE

PRIORITY INFORMATION

This application is based on and claims priority to Japanese Patent Application No. 10-351851, filed Dec. 10, 1998.

BACKGROUND OF THE INVENTION

1. Field of the Invention

The present invention is directed to a watercraft, and more particularly to an improved air induction system employed in an engine of a watercraft.

2. Description of the Related Art

Personal watercraft have become increasingly popular in recent years. This type of watercraft is sporting in nature; it turns swiftly, it is easily maneuverable, and accelerates quickly. A personal watercraft today commonly carries one rider and up to three passengers. Typically, the rider and passengers sit on a straddle-type seat that is formed by the hull of the watercraft. The straddle-type seat is generally aligned with the longitudinal axis of the hull.

The space beneath the straddle-type seat is usually used as an engine compartment for supporting and housing the engine within the watercraft. The engine is preferably arranged within the engine compartment so that the crankshaft of the engine is aligned with the longitudinal axis of the watercraft. With the engine arranged as such, the crankshaft of the engine may be directly connected to an output shaft for driving a propulsion unit. Additionally, such an arrangement allows the engine to be arranged at least partially within the seat pedestal. Arranged as such, the engine and the seat pedestal form a compact unit. During operation, the rider and any passengers straddle the seat, and thus a portion of the engine while they are seated on the straddle-type seat. This hull shape requires the engine to be in close spacing with the passengers during operation, thus allowing the overall size of the watercraft to remain small, resulting in a compact and highly maneuverable watercraft.

Although these watercraft are generally highly maneuverable and are used in a sporting manner, there is an interest in reducing the noise generated by this type of watercraft. One part of the watercraft propulsion system that can generate noise is the induction system of the engine. For the most part, the induction systems used for this type of watercraft have been designed primarily to ensure adequate air induction and at least some filtration of the inducted air. Less effort has been given, however, to the silencing of the induction system.

In response to the noise generated by two-cycle engines, which are commonly employed in personal watercraft, certain recreational facilities have banned the operation of two-cycle engine powered watercraft. Such bans have resulted in a decrease in popularity of personal watercraft powered by two-cycle engines.

Obviously, it is necessary for the induction system to be able to ingest an adequate flow of air for maximum engine performance. In many instances, the induction systems previously proposed for watercraft have not recognized the advantages of using a tuning arrangement on the intake side of the engine. One reason for this is that the space available in an engine compartment of a personal watercraft generally does not afford room for various types of intake tuning systems. Although it has been known that a large intake air box will prevent the generation of loud noises in the induction system and will generate a smooth flow of air into the combustion chambers, the small space available in the hulls of small watercraft have prevented the use of large air boxes. In addition, the space available makes it difficult to tune the induction system to improve intake efficiency.

For example, a large air box mounted so as to feed the intake runners arranged along one side of an engine within the engine compartment of a watercraft will tend to attenuate induction noises and improve intake efficiency. However, as discussed above, engines are preferably arranged within the seat pedestals of personal watercraft such that their crankshaft is aligned with the longitudinal axis of the watercraft. As such, the intake runners open at a side of the engine body, facing an inner wall of the seat pedestal. Therefore, the size of the intake air box affects the overall width of the engine. If a large intake air box is used, the overall width of the engine is increased.

Since the rider and any passengers straddle the seat pedestal and engine during operation, the overall width of the engine is limited to that which would fit within a straddle-type seat pedestal. If the pedestal is too wide, a rider cannot comfortably sit on the seat pedestal during operation of the watercraft. Therefore, any portions of the engine mounted along either side of the engine body, such as the induction system, should be small enough such that the engine can still fit within the seat pedestal defining an engine compartment of the watercraft.

Additionally, because of its sporting nature, personal watercraft are oftentimes laid on their side or are flipped over by advanced riders during use. It thus is also important that the induction system be designed in such a way to inhibit ingesting water, which may be present in the engine compartment, into the engine through the induction system.

SUMMARY OF THE INVENTION

A need therefore exists for a compact induction system employed in an engine of a watercraft which reduces noise and which allows a sufficient flow of combustion air to enter the induction system under all operating conditions. For example, it is desirable to provide an induction system for a watercraft engine which allows for a substantially instantaneous increase in air flow during a sudden movement of the throttle from an idle to a fully open position.

According to one aspect of the present invention, an induction system employed in an engine of a small watercraft includes a first intake air chamber communicating with at least one combustion chamber of the engine, and a second intake air chamber communicating with the first intake air chamber. The first intake air chamber includes a plurality of walls defining an interior volume within the first intake air chamber. According to the present aspect of the invention, the first intake air chamber includes at least one auxiliary air aperture formed in one of the walls defining the interior volume. By providing the first intake air chamber with at least one auxiliary air aperture, the present invention allows an auxiliary flow of air to flow into the first intake air chamber after a sudden opening of the throttle, while benefiting from the quieting and smoothing effects provided by the inclusion of first and second intake air chambers.

One aspect of the present invention includes the realization that certain induction systems are slow to respond to sudden increases in the air flow rate required by the engine. For example, when an engine of a small watercraft is idling, and the throttle is suddenly moved to a wide-open position, the air flow rate needed to produce the maximum power output from the engine also rises suddenly. However, it has been found that induction systems that have noise attenuating characteristics, generate at least some friction and/or air resistance which causes a delay in the acceleration of the air flow therethrough. For example, an induction system which includes two intake chambers communicating with one another so as to form an induction air flow path, attenuates induction noise and smoothes the flow of air therethrough. However, such an induction system also generates at least some friction and thus a delay in air flow acceleration. It has been found that such a delay causes a corresponding delay in the power output of the engine, thereby slowing the acceleration of the watercraft.

By providing the first intake air chamber with a auxiliary air aperture, the induction system of the present invention allows an auxiliary flow of air to enter the first intake air chamber while the main flow of air entering the first intake air chamber from the second intake air chamber accelerates. By allowing the auxiliary flow of air to enter the first intake air chamber, the present invention provides the engine with a sufficient air flow to feed the engine when the throttle is suddenly moved to a wide open position. Therefore, the present invention enhances the performance of a watercraft engine while remaining quiet, and smoothing the air flow into the engine.

In a preferred embodiment, the auxiliary air aperture is formed on an inner wall of the first intake air chamber which is positioned between the interior of the first intake air chamber and the engine. By arranging the auxiliary air aperture as such, the likelihood that water may splash into the auxiliary air aperture is greatly reduced.

Further aspects, features, and advantages of the present invention will become apparent from the Detailed Description of the Preferred Embodiment which follows.

BRIEF DESCRIPTION OF THE DRAWINGS

The above-mentioned and other features of the invention will now be described with reference to the drawings of a preferred embodiment of the present induction system. The illustrated embodiment is intended to illustrate, but not to limit the invention. The drawings contain the following figures:

FIG. 17 is a side elevational view of the outer cover shown in FIG. 15;

FIG. 18 is a cross-sectional view taken along line 18—18 shown in FIG. 15;

DETAILED DESCRIPTION OF THE PREFERRED EMBODIMENT

Figure 1:
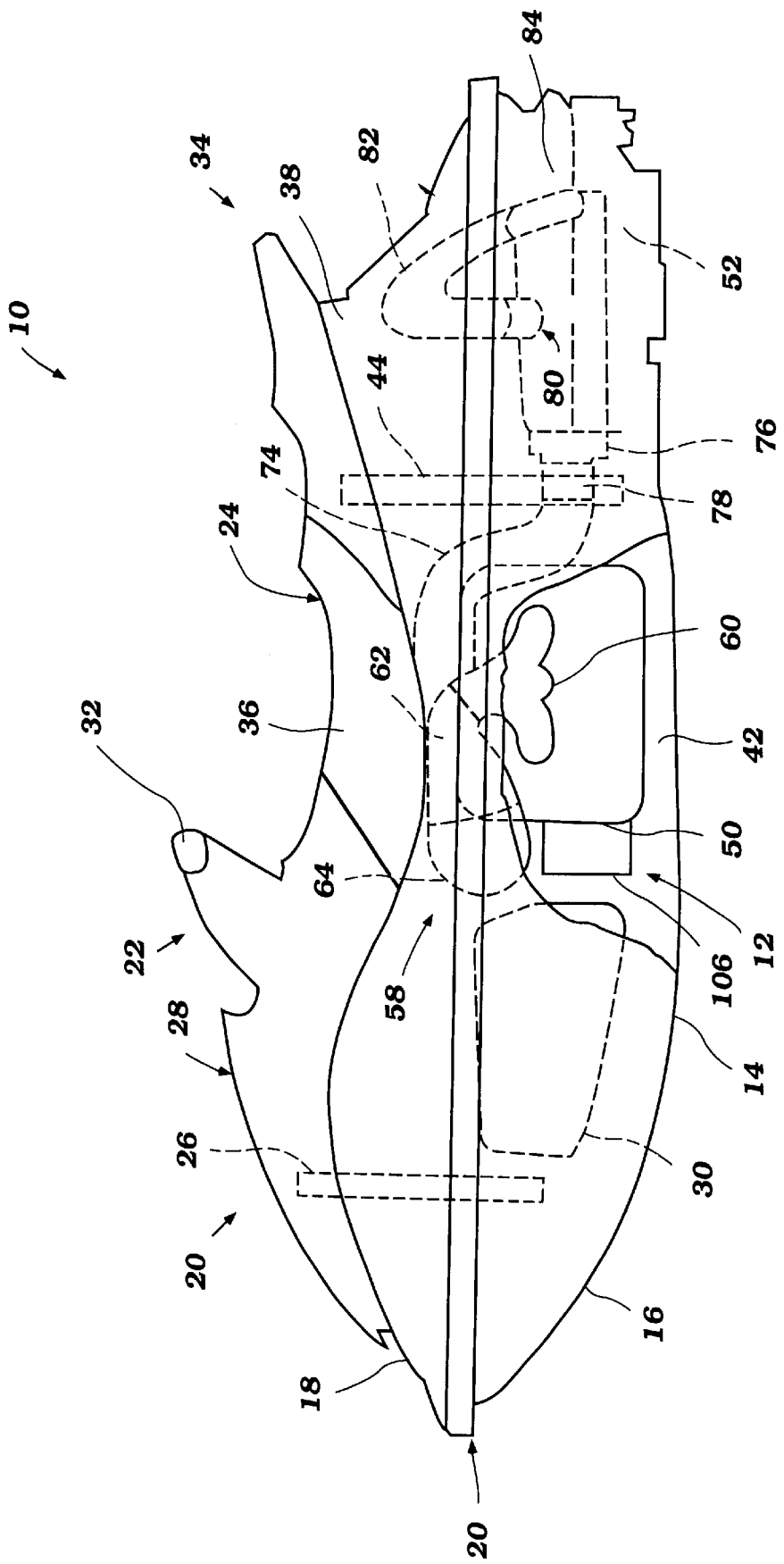
FIG. 1 is a partial cut-away side elevational view of a watercraft having an induction system constructed in accordance with the present invention, with some internal components of the watercraft shown in phantom lines.
Figure 2:
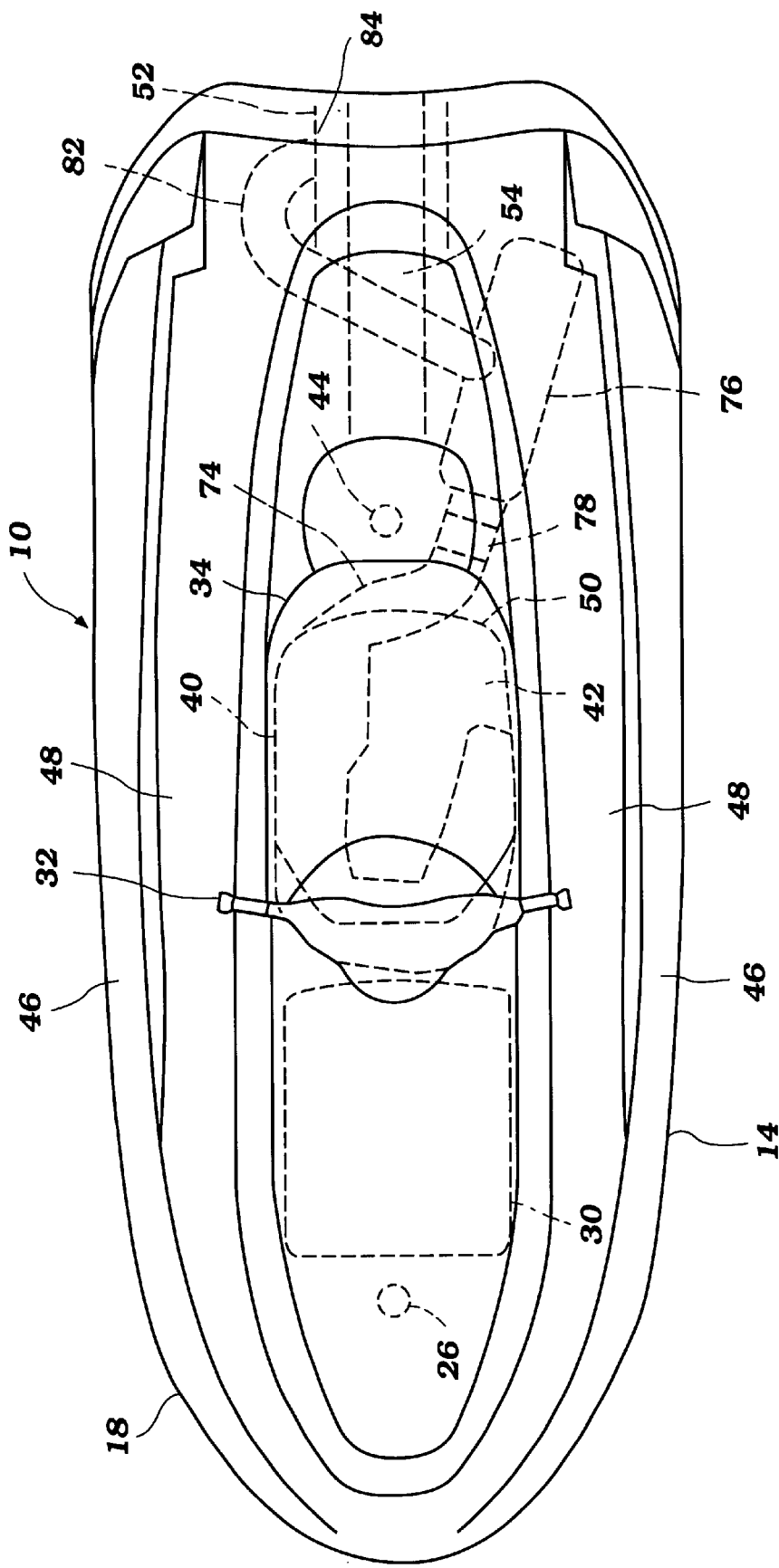
FIG. 2 is a top plan view of the watercraft shown in FIG. 1, with the internal components shown in phantom lines.

FIGS. 1 and 2 illustrate different views of a small watercraft incorporating an induction system configured in accordance with the preferred embodiment of the present invention. The induction system includes enhanced airflow characteristics, which enhances engine performance particularly during sudden acceleration.

FIG. 1 illustrates a personal watercraft 10 which includes an induction system 12 configured in accordance with the preferred embodiment of the present invention. Although the present induction system 12 is illustrated in connection with a personal watercraft, the illustrated induction system 12 can be used with other types of watercraft as well, such as, for example, but without limitation, small jet boats and the like. Before describing the induction system 12, an exemplary personal watercraft 10 will first be described in general details to assist the reader's understanding of the environment of use and the operation of the induction system 12.

The watercraft 10 includes a hull 14 formed by a lower hull section 16 and an upper deck section 18. The hull sections 16, 18 are formed from a suitable material, such as, for example, a molded fiberglass reinforced resin (e.g., SMC). The lower hull section 16 and the upper deck section 18 are fixed to each other around a peripheral edge 20 in any suitable manner.

As viewed in the direction from the bow to the stem of the watercraft, the upper deck section 18 includes a bow portion 20, a control mast 22, and a rider's area 24. The bow portion 20 slopes upwardly toward the control mast 22 and includes at least one air duct 26 through which air can enter the hull 14. A hatch cover 28 desirably extends above an upper end of the air duct 26 to inhibit an influx of water into the hull.

The hatch cover 28 is preferably attached to the upper deck section 18 via a hinge. The hatch cover 28 provides access to an access hole which may be used to provide access to a storage compartment for storing any other desired item.

A fuel tank 30 is preferably located within the hull 14 beneath the hatch cover 28. Conventional means, such as, for example, straps, are preferably used to secure the fuel tank 30 to the lower hull section 16.

The control mast 22 extends upward from the bow portion 20 and supports a handlebar assembly 32. The handlebar 32 controls the steering of the watercraft 10 in a conventional manner. The handlebar assembly 32 also carries a variety of controls of the watercraft 10, such as, for example, a throttle control, a start switch and a lanyard switch.

A display panel (not shown) is desirably located in front of the control mast 22 on the bow portion 20 and is oriented to be visible by the rider. The display panel desirably displays a number of performance characteristics of the watercraft, such as, for example, watercraft speed (via a speedometer), engine speed (via a tachometer), fuel level, oil level, engine temperature, battery charge level, and the like.

The rider's area 24 lies behind the control mast 22 and includes a seat assembly 34. In the illustrated embodiment, the seat assembly 34 has a longitudinally extending straddle-type shape that may be straddled by an operator and by at least one to three passengers. The seat assembly 34, at least in principal part, is formed by a seat cushion 36 supported by a raised pedestal 38.

The raised pedestal 38 has an elongated shape and extends longitudinally along the center of the watercraft 10. The seat cushion 36 desirably is removably attached to a top surface of the pedestal 38 and covers the entire upper end of the pedestal for rider and passenger comfort.

Figure 6:
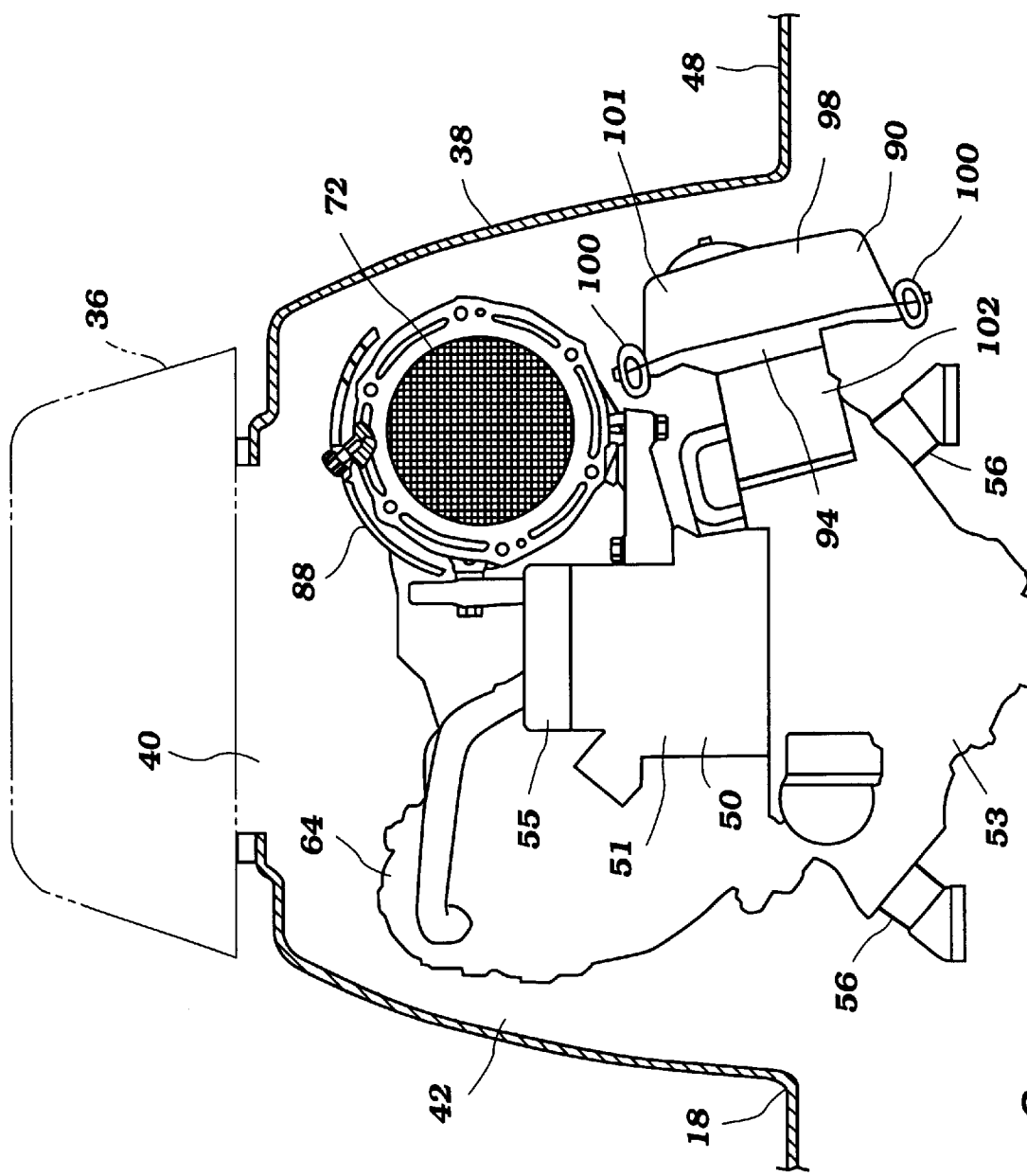
FIG. 6 is a rear elevational view of the engine shown in FIG. 5, with a rear of an exhaust system removed.

As shown in FIG. 6, an access opening 40 is preferably located on an upper surface of the pedestal 38. The access opening 40 opens into an engine compartment 42 formed within the hull 14. The seat cushion 36 normally covers and seals the access opening 40. When the seat cushion 36 is removed, the engine compartment 42 is accessible through the access opening 40.

As shown in FIG. 1, the pedestal 38 also desirably includes at least one air duct 44 located behind the access opening 40. The air duct 44 communicates with the atmosphere through a space formed between the pedestal 38 and the seat cushion 36, which is formed behind the access opening 40. Air can pass through the rear duct 44 in both directions.

As shown in FIG. 2, the upper deck section 18 advantageously includes a pair of raised gunnels 46 positioned on opposite sides of the aft end of the upper deck 18. The raised gunnels 46 define a pair of foot areas 48 that extend generally longitudinally and parallel to the sides of the pedestal 38. In this position, the operator and any passengers sitting on the seat assembly 34 can place their feet in the foot areas 48 with the raised gunnels 46 shielding the feet and lower legs of the riders. A non-slip (e.g., rubber) mat desirably covers the foot areas 48 to provide increased grip and traction for the operator and the passengers.

The lower hull portion 16 principally defines the engine compartment 42. Except for the air ducts, the engine compartment 42 is normally substantially sealed so as to enclose an engine 50 of the watercraft 10 from the body of water in which the watercraft is operated.

The lower hull section 16 is designed such that the watercraft 10 planes or rides on a minimum surface area at the aft end of the lower hull 16 in order to optimize the speed and handling of the watercraft 10 when up on plane. For this purpose, the lower hull section 16 generally has a V-shaped configuration formed by a pair of inclined sections that extend outwardly from a keel line of the hull to the hull's side walls at a dead rise angle. The inclined sections also extend longitudinally from the bow toward the transom of the lower hull section 16. The side walls are generally flat and straight near the stern of the lower hull 16 and smoothly blend towards the longitudinal center of the watercraft at the bow. The lines of intersection between the inclined sections and the corresponding side walls form the outer chines of the lower hull section.

As shown in FIG. 2, toward the transom of the watercraft, a recessed channel or tunnel 52 is formed on the lower surface of the lower hull section 16. The watercraft 10 includes a jet pump unit 54 which produces a rearwardly directed flow of water which generates a propulsion force to thereby cause forward and/or reverse movement of the watercraft 10.

The jet pump unit 54 is mounted within the tunnel 52 by a plurality of bolts. An intake duct of the jet pump unit 54 defines an inlet opening (not shown) that opens into a gullet. The gullet leads to an impeller housing assembly in which the impeller of the jet pump unit 54 operates. An impeller housing assembly also acts as a pressurization chamber and delivers the water flow from the impeller housing to a discharge nozzle housing.

The jet pump unit 54 desirably includes a steering nozzle at its aft end. The steering nozzle is connected to the handlebar assembly 32 through, for example, a bowden-wire actuator, as known in the art. In this manner, the operator of the watercraft 10 could move the steering nozzle to effect directional changes of the watercraft 10.

A ride plate (not shown) preferably covers a portion of the tunnel 52 behind the inlet to enclose the jet pump assembly 54 and a nozzle assembly thereof. The aft end of an impeller shaft (not shown) is suitably supported and journaled within the engine chamber 42 of the assembly in a known manner. The impeller shaft extends in a forward direction through a front wall of the tunnel 52 and/or a bulkhead (not shown).

With reference to FIG. 1, the internal combustion engine 50 of the watercraft 10 powers the impeller shaft to drive the impeller of the jet pump unit 54. The engine 50 is positioned within the engine compartment 42 and is mounted primarily beneath the riders' area 24. A plurality of vibration absorbing engine mounts 56, as shown in FIG. 6, are preferably used to secure the engine 50 to the lower hull portion 16 in a known manner. The engine 50 is mounted in approximately a central position within the watercraft 10.

Figure 7:
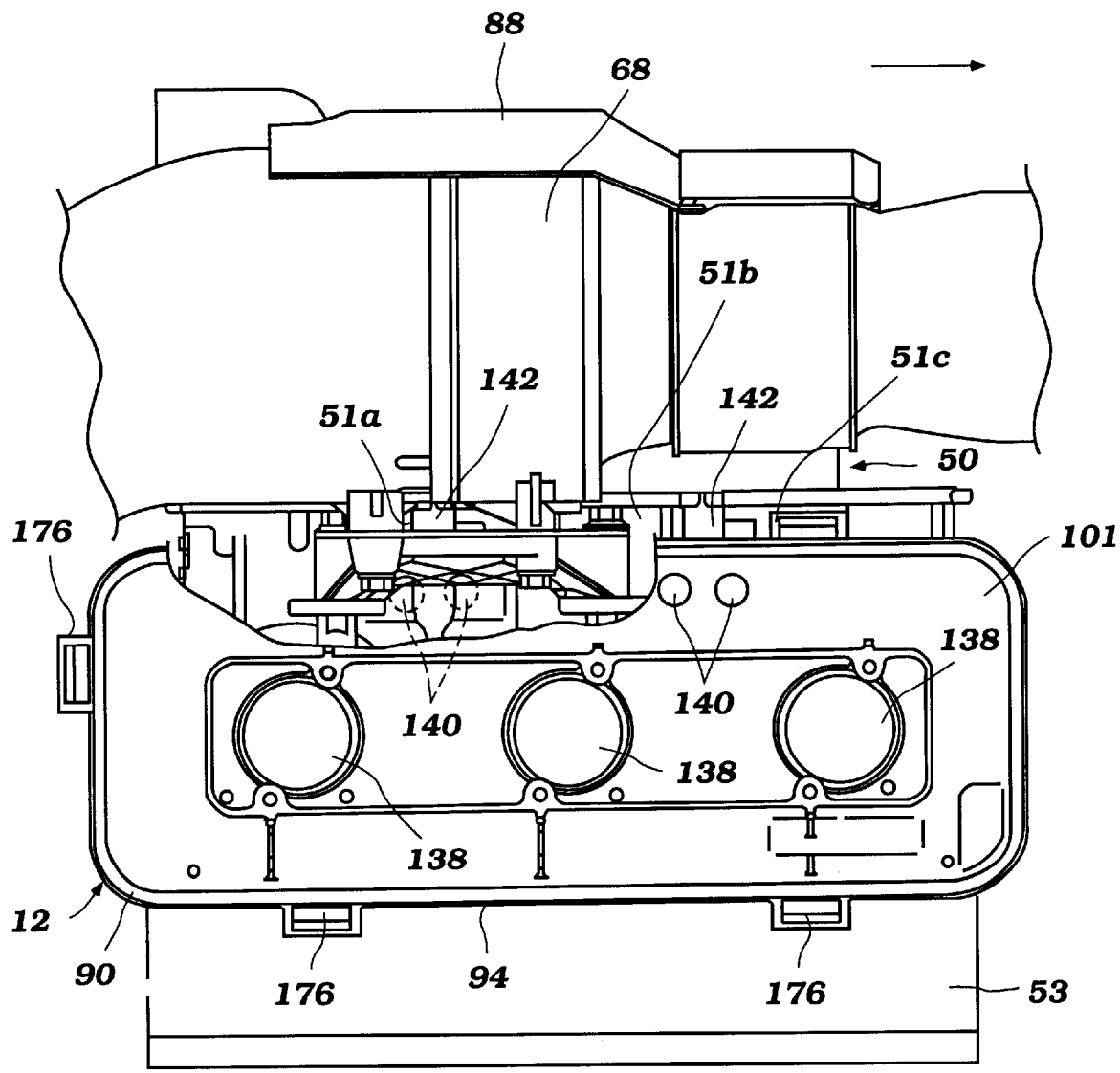
FIG. 7 is a partial cut-away view of an intake air chamber constructed in accordance with one aspect of the present invention, with an outer cover removed.

With reference to FIG. 6, the engine 50 includes three in-line cylinders and operates on a two-stroke, crankcase compression principal. The engine 50 is positioned such that the row of cylinders lies parallel to the longitudinal axis of the watercraft 10, running from bow to stem. The cylinders are formed within a cylinder block 51, which is mounted to a crank case 53 at a lower end, and a cylinder head 55 at an upper end, as shown in FIG. 6. The cylinder block 51 defines three cylinders 51a, 51b, and 51c, as shown in FIG. 7. The axis of each cylinder 51a, 51b, 51c may be parallel, skewed, or inclined, relative to the vertical central plane of the watercraft 10, in which the longitudinal axis lies. This engine type, however, is merely exemplary. Those skilled in the art will readily appreciate that the present induction system can be used with any of a variety of engine types having other numbers of cylinders, having other cylinder arrangements and operating on other combustion principals (e.g., four stroke and rotary principles).

With reference to FIG. 2, the jet pump unit 54 preferably supplies cooling water through a conduit (not shown) to an engine cooling jacket (not shown). For this purpose, an outlet port may be formed on the housing of the jet pump unit 54. The conduit may be coupled to an outlet port and extends to an inlet port for supplying coolant, such as water, to the engine cooling jacket. The engine cooling jacket extends through the exhaust manifold, the cylinder block, about the cylinders, and through the cylinder head assembly. The cylinder head assembly and/or the exhaust manifold can include a coolant discharge port through which the cooling water exits the engine and flows through at least a portion of an exhaust system 58.

Figure 3:
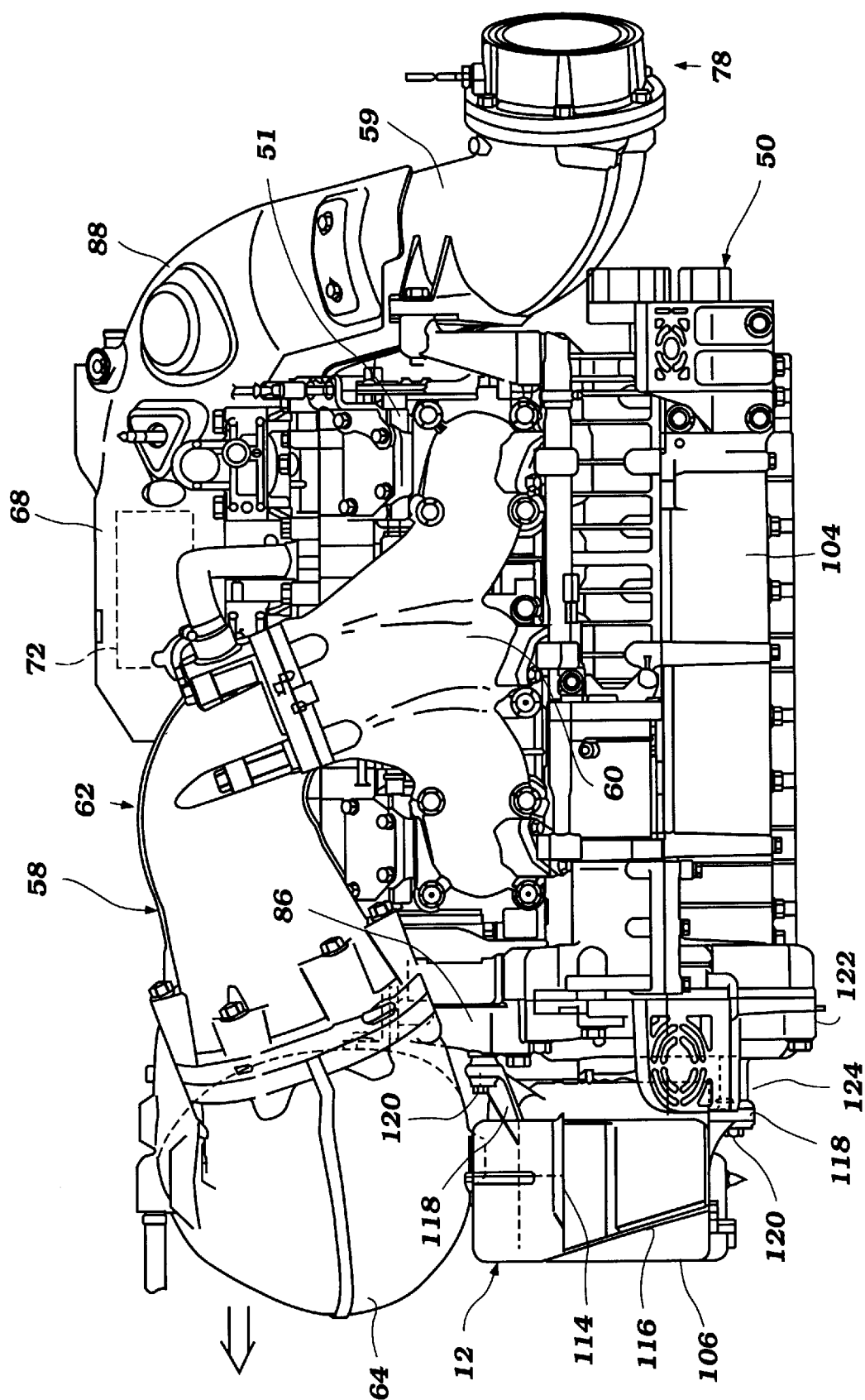
FIG. 3 is a left side elevational view of an engine having an induction system constructed in accordance with the present invention.
Figure 5:
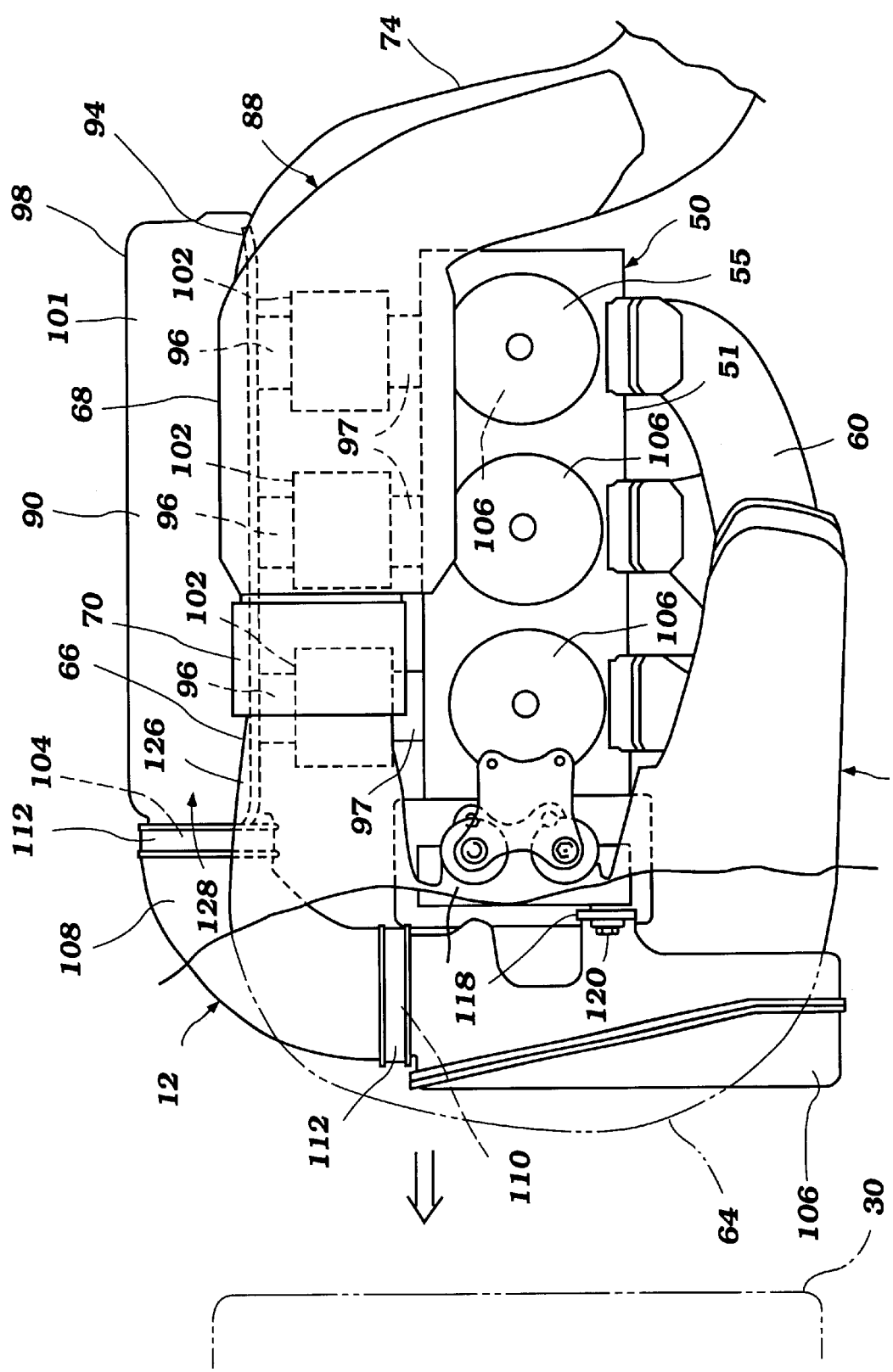
FIG. 5 is a top plan view of the engine shown in FIG. 4, with charge formers shown in phantom.

With reference to FIGS. 1 and 2, the exhaust system 58 of the engine is generally comprised of an exhaust pipe 59 which connects the combustion chambers defined within the cylinder block 51 to the atmosphere. The exhaust passage comprises an exhaust manifold 60 mounted to the side of the engine 50 so as to communicate with the combustion chambers defined within the engine 50. The exhaust manifold 60, at a discharge end, is connected to an exhaust passage 62, which is connected to an expansion chamber 64. As shown in FIG. 5, a downstream end 66 of the expansion chamber 64 communicates with the catalytic device chamber 68 through a coupling 70. As shown in FIG. 3, the catalytic device chamber 68 preferably includes a catalytic device 72 formed of a catalytic bed.

The exhaust manifold 60, the exhaust passage 62, the expansion chamber 64, the downstream end 66, and the catalytic device chamber 68 each include a coolant jacket in thermal communication therewith. The coupling 70 preferably comprises an exhaust passage directed through a center thereof and a coaxial coolant passage which connects the cooling jacket formed around the downstream end 66 to the cooling jacket formed around catalytic device chamber 68.

With reference to FIG. 1, downstream from the catalytic device chamber 68, the exhaust system 58 includes a downturned portion 74 which leads to a water trap device 76. As shown in FIGS. 1 and 3, the downturned portion 74 is connected to the water trap device 76 via a coupling 78, which may comprise a flexible pipe. The water trap device 76 includes an outlet 80 leading to a discharge pipe 82 that terminates in an exhaust discharge 84.

The exhaust discharge 84 is desirably positioned so as to terminate in the hull tunnel 52. Preferably, the exhaust discharge 84 is positioned above or below the water line of the watercraft 10.

Figure 4:
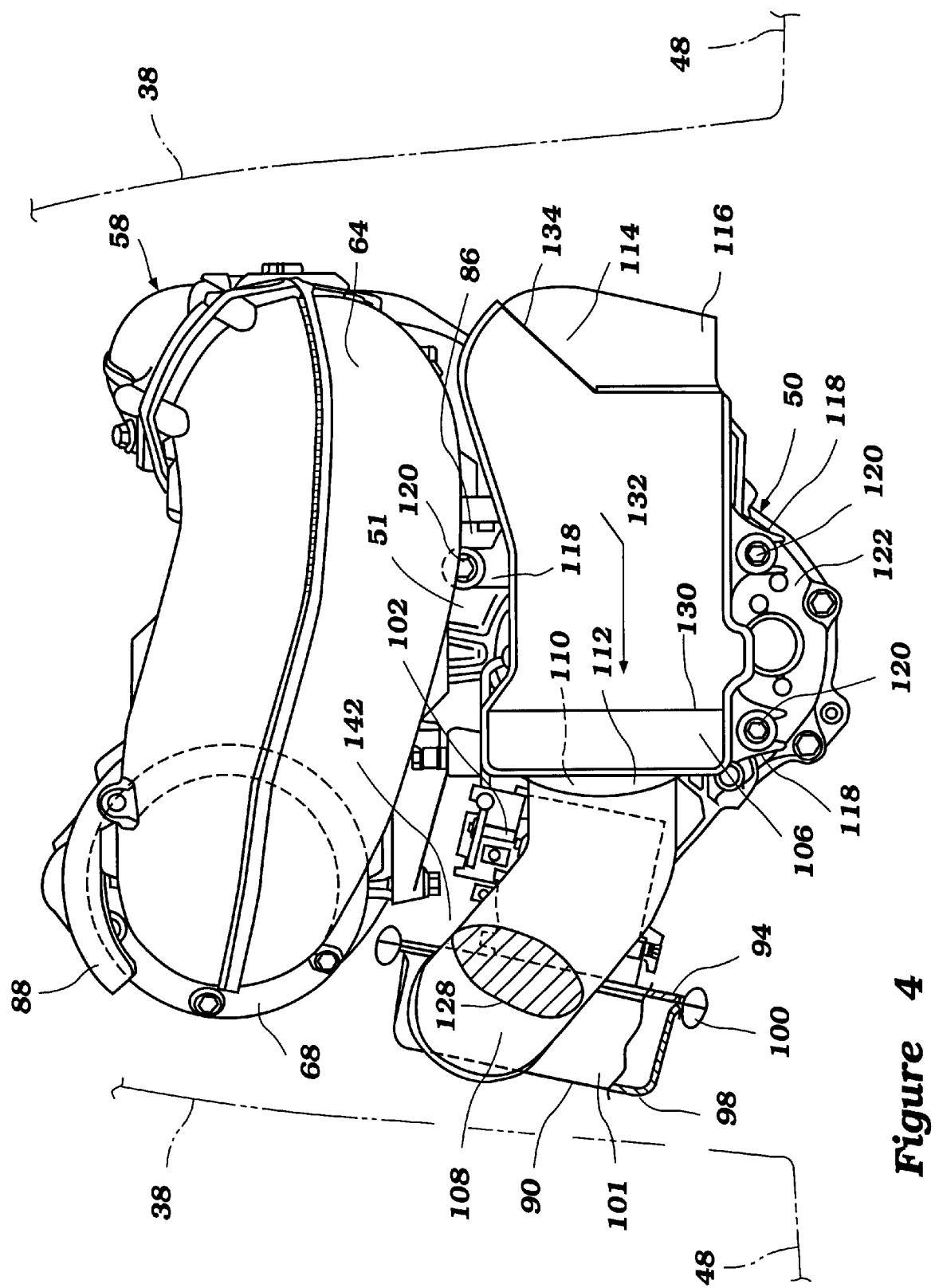
FIG. 4 is a front elevational view of the engine shown in FIG. 3.

With reference to FIGS. 3 and 5, the expansion chamber 64 of the exhaust system 58 is preferably supported by one or more mounting bracket(s) 86. The expansion chamber 64 is connected to the mounting bracket 86 by a plurality of bolts, to support the forward portion of the exhaust system 58. Additionally, as shown in FIGS. 3, 4, and 6, the catalytic device chamber 68 and at least a portion of the downturned portion 74 have a heat shield 88 mounted thereon. The heat shield 88 is made from a suitably heat resistant material, such as resin, or other materials appropriate for use as a heat shield.

In operation, exhaust gases are discharged from the combustion chambers within the engine 50 to the exhaust manifold 60. The exhaust gases then flow out of the exhaust manifold 60 and through the exhaust passage 62, expansion chamber 64, catalytic device 72, downturned portion 74, water trap device 76, discharge pipe 82, and discharge 84. During operation, as discussed above, the exhaust manifold 60, the exhaust passage 62, the expansion chamber 64, the catalytic device chamber 68, and at least a portion of the downturn portioned 74, are cooled by a flow of water produced by the jet pump unit 54, and directed into the respective coolant jackets in thermal communication therewith.

The personal watercraft 10 so far described represents only an exemplary watercraft on which the present induction system 12 can be employed. A further description of the personal watercraft 10 is not believed to be necessary for an understanding and an appreciation of the present induction system 12. The induction system 12 will now be described in detail.

With reference to FIGS. 4 and 5, the induction system 12 includes a first intake air chamber 90. The first intake air chamber 90 is preferably formed of an inner wall member 94 connected to intake runners 96, and a cover member 98 engaged with the wall member 94 along a joining portion 100 formed therebetween, so as to define an interior volume 101. A detailed description of the first intake air chamber 90 is set forth below with reference to FIGS. 7–21.

As shown in FIG. 5, the intake runners 96 communicate with fuel charge formers 102. Together, the intake runners 96 and fuel charge formers 102 deliver a fuel and air mixture to the crankcase 534 of the engine 50 for combustion within the combustion chambers 106 which are schematically represented in FIG. 5. In the illustrated embodiment, floatless-type carburetors act as the fuel charge formers 102, and communicate with individual crankcase chambers through intake pipes 97. Fuel injectors can also be used as the charge formers, and can be arranged either for direction injection or for intake injection (i.e., communicate with the intake pipes 97). In either case, the intake pipes 97 would extend from the first intake chamber 92 to the individual crankcase chambers. Alternatively, the engine 50 could be constructed to operate under a direct injection principle, under which, the fuel charge formers 102 would be mounted to the cylinder head 55.

As discussed above, in the illustrated embodiment, the engine 50 operates under a crankcase compression principal. However, it is readily understood by one of ordinary skill in the art that the induction system 12 can be used with other types of engines operating on other principals of operation, such as four stroke and rotary principals.

With reference to FIG. 5, the first intake air chamber 90 includes an inlet 104 which communicates with a second intake air chamber 106 via a conduit 108, connected to the inlet 104 at an upstream end of the first intake air chamber 90, in the direction of air flow. As shown in FIG. 5, the conduit 108 communicates with the second intake air chamber 106 through an outlet 110 of the second intake air chamber. The conduit 108 is attached to the inlet 104 and the outlet 110 via couplings such as band clamps 112.

As shown in FIG. 3, the second intake air chamber 106 includes an inlet 114, which is generally open to the engine compartment 42, so as to allow air from the engine compartment 42 to enter the second intake air chamber. The second intake air chamber 106 preferably includes an L-shaped member 116 protruding from an end surface of the second intake air box. The L-shaped member 116 is spaced from and opposed to the inlet 114, so as to shield the opening from water that may inadvertently splash into the inlet 114 during the operation of the watercraft 10.

Constructed as such, the second intake air chamber 106, the conduit 108, and the first intake air chamber 90 define an induction air flow path for air entering the engine 50 for combustion purposes. Furthermore, by constructing the induction system 12 in the form of a first chamber connected to a second chamber by a conduit, the induction system 12 provides for the efficient use of the relatively small amount of space available in a small watercraft.

For example, as is illustrated in FIGS. 4–6, the engine compartment 42 is nearly completely filled by the engine 50.

As shown in FIGS. 4 and 6, the width of the engine 50 is nearly as wide as the engine compartment 42, along a direction transverse to the longitudinal direction of the watercraft 10. Additionally, as shown in FIG. 5, the engine 50 is in close proximity to the fuel tank 30. Additionally, because the engine compartment 42 is positioned generally below the seat assembly 34, the maximum width of the engine compartment 42 is limited. For example, beacuse the passengers of the watercraft 10 sit directly above the engine 50, and on the seat assembly 34 in a straddle-type fashion, the width of the engine compartment 42 is limited to that which is appropriate for a width of a straddle-type seat assembly such as the seat assembly 34. Therefore, by providing the induction system 12 with a first intake air chamber 90 and a second intake air chamber 106, which communicate with each other so as to define an induction air flow path, the present aspect of the invention allows the second intake air chamber to be arranged remotely from the first intake air chamber 90, thus efficiently using the space available within the engine compartment 42.

The second intake air chamber 106 is preferably mounted between the engine 50 and the fuel tank 30, as shown in FIGS. 1 and 5. Arranged as such, the induction system 12 utilizes a space which has heretofore gone unused within the hulls of known personal watercraft.

Additionally, the second intake air chamber 106 is preferably mounted directly to the engine 50. As shown in FIGS. 4 and 5, the second intake air chamber 106 preferably includes a plurality of mounting brackets 118 which are configured to receive bolts 120. As shown in the figures, the bolts 120 connect the second intake air chamber to the front portion of the engine 50. The bolts 120 may be threadably engaged with a flywheel cover 122 of the engine 50 and/or mounting brackets 86, 124, extending from the flywheel cover 122.

Mounted as such, the induction system 12 can be securely mounted to the engine 50 such that the engine 50, including the induction system 12, can be assembled as a discrete unit, which may then be transported to a distant facility for installation into a vehicle such as the watercraft 10.

With reference to FIGS. 4 and 5, the induction system 12 preferably defines an induction air flow path that contracts and expands along its length. For example, as shown in FIG. 5, the first intake air chamber 90 defines a cross-sectional air flow area 126 that is defined along a plane generally perpendicular to the direction of air flow 128 into the first intake air chamber 90. As shown in FIG. 4, the conduit 108 defines a minimum cross-sectional flow area 128 which is smaller than the cross-sectional flow area 126.

The second intake air chamber 106 defines a cross-sectional air flow area 130 defined along a plane generally perpendicular to the flow of air 132 through the second intake air chamber 106. The cross-sectional air flow area 130 preferably is larger than the cross-sectional air flow area 128. The inlet 114 similarly defines a cross-sectional air flow area 134 that is smaller than the cross-sectional air flow area 130. While the cross-sectional flow areas of the first intake air chamber 90, the second intake air chamber 106, and the conduit 108 each have a generally uniform cross-sectional shape along their respective lengths, each of these components can have varying cross-sectional shapes in other applications.

In operation, a flow of air into the induction system 12 contracts and expands as it flows therethrough. For example, as air from the engine compartment 42 enters the inlet 114, the air flow accelerates as it passes through the cross-sectional air flow area 134. As the air flow moves past the cross-sectional air flow area 134 and through the cross-sectional air flow area 130, the air flow expands and therefore slows. As such, the air flow is quieted and smoothed by the contraction and expansion. Similarly, as the air flow leaves the second intake air chamber 106 and enters the conduit 108, the air flow is contracted and therefore accelerated, since the cross-sectional air flow area 128 of the conduit 108 is smaller than the cross-sectional air flow area 130. As the air flow exits the conduit 108 and enters the first intake air chamber 90, the cross-sectional air flow area of the air flow expands generally to the size and shape of the cross-sectional air flow 126 defined within the first intake air chamber 90. Accordingly, the air flow is again expanded, thereby slowing the air flow which quiets and smoothes the air flow.

Figure 8:
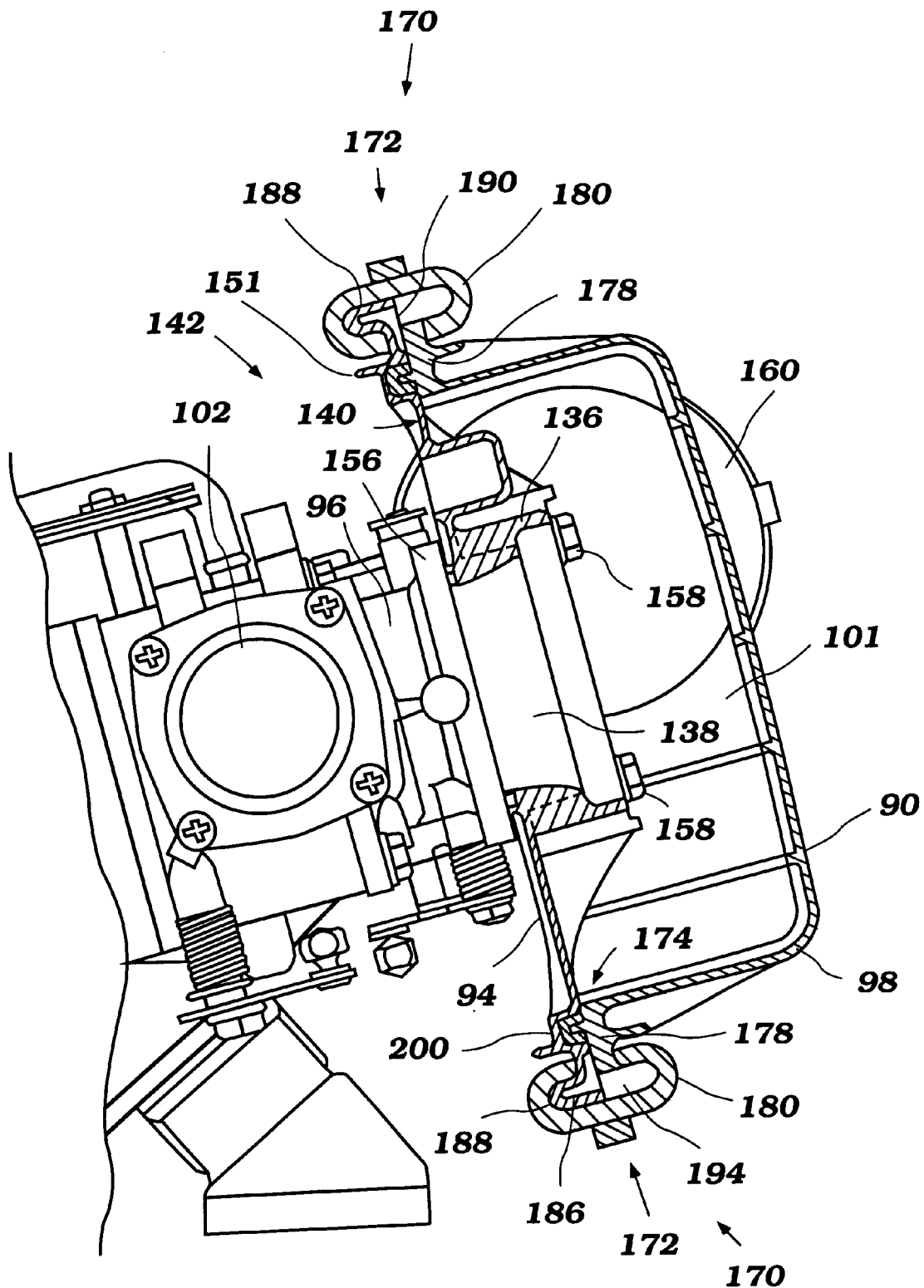
FIG. 8 is a partial cross-sectional and enlarged view of the intake air chamber shown in FIG. 6, mounted to a charge former.
Figure 11:
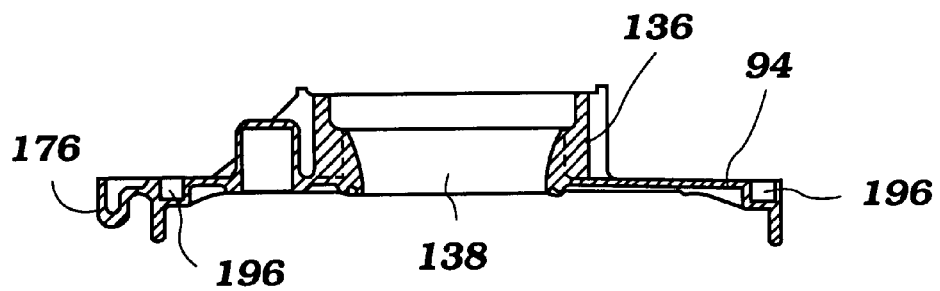
FIG. 11 is a cross-sectional view taken along line 11—11 of the inner wall shown in FIG. 9.

With reference to FIG. 7, the first intake air chamber 90 is shown with the cover member 98 removed and the inner wall 94 mounted to the runners 96. As shown in FIGS. 8 and 11, the inner wall 94 includes a plurality of sleeves 136 in the form of annular intake ports defining a plurality of intake passages 138. As shown in FIG. 7, there is one sleeve 136 for each cylinder of the engine 50. As shown in FIG. 8, the intake passages 138 are generally aligned with the intake runners 96 so as to form individual air flow paths for each cylinder included in the engine 50.

As shown in FIGS. 7 and 8, the first intake air chamber 90 is provided with at least one auxiliary air aperture 140 formed in one of the walls defining the first intake air chamber 90, so as to allow the interior of the first intake air chamber 90 to communicate directly with the surrounding atmospheric air in the engine compartment 42. As shown in FIG. 7, the first intake air chamber 90 preferably includes a plurality of auxiliary air apertures 140. At least one auxiliary air aperture 140 preferably is arranged between each pair of intake passages 138. More preferably, a pair of auxiliary air apertures 140 is formed between each pair of intake passages 138.

As shown in FIG. 7, the auxiliary air apertures 140 are preferably arranged above the intake passages 138, and are formed in the inner wall 94 of the first intake air chamber 90. The auxiliary air apertures 140 are arranged in the inner wall 94 so that the interior of the intake air chamber 90 communicates with a dead space 142 formed between the first intake air chamber 90 and the engine 50.

The dead space 142 is formed below a portion of the exhaust system 50 that is arranged above the fuel charge formers 102. The dead space 142 is also between the engine 50 and the first intake air chamber 90.

Positioned as such, the dead space 142 and the auxiliary air apertures 140 are substantially shielded from water that may collect in the bottom of the hull section 16 and splash upon the engine 50. As shown in FIG. 4, with the dead space 142 defined between the engine 50, the fuel charge formers 102, the first intake air chamber 90, and the exhaust system 50, the likelihood that water may splash into the auxiliary air apertures 140 is reduced.

Figure 9:
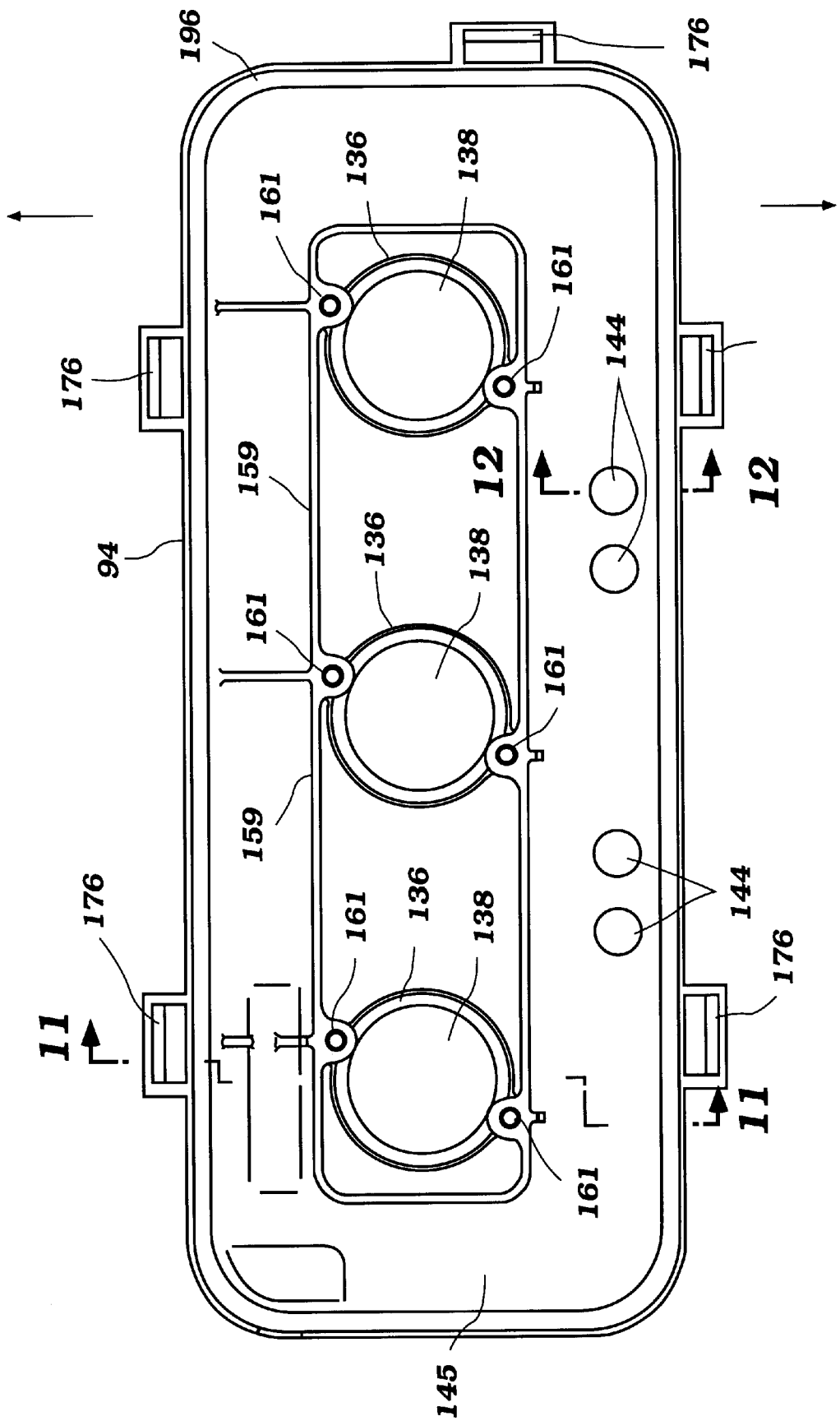
FIG. 9 is a front elevational view of an inner wall of the intake air chamber shown in FIG. 7.
Figure 10:
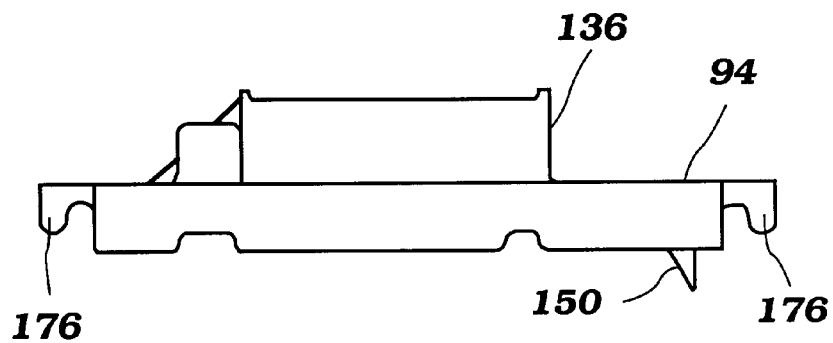
FIG. 10 is a side elevational view of the outer cover shown in FIG. 9.

With reference to FIG. 9, the inner wall 94 may include at least one auxiliary air aperture 144 in addition or alternatively to the auxiliary air apertures 142. As shown in FIG. 9, at least one auxiliary air aperture 144 is formed below the intake passages 138. Preferably, a plurality of the auxiliary air apertures 144 are formed below the intake passages 138 so as to communicate the interior of the first intake air chamber 90 with the surrounding atmospheric air.

With the auxiliary air apertures 144 arranged below the intake passages 138, the auxiliary air apertures 144 are arranged closer to a lower surface of the lower hull section 16. Therefore, the auxiliary air apertures 144 allow the first intake air chamber to communicate with the relatively large supply of cooler air near the bottom of the lower hull section 16.

It has been found that the total cross sectional air flow area defined by the auxiliary air apertures 140 and/or 144 provided in the inner wall 94 should be from 5–25% of the point of maximum restriction in the induction system, upstream from the first intake air chamber 90. In the illustrated embodiment, the point of maximum restriction is located at the interface opening between the first air intake chamber 90 and the conduit 108 (which in the illustrated embodiment is generally the same as the cross sectional air flow area 128 of the conduit 108). Provided as such, the auxiliary air apertures 140, 144 allow an auxiliary flow of air to enter the first intake air chamber 101 when, for example, but without limitation, the throttle is suddenly moved from an idle position to the wide open position. As such, the induction system retains quieting and smoothing characteristics associated with the contraction and expansion created by the conduit and the first and second air intake air chambers. Preferably, the total cross sectional air flow area defined by the auxiliary air apertures 140 and/or 144 is from about 10% to about 20% of the area 128.

In an exemplary embodiment, the diameter of the conduit 108 is 91.6 mm, thereby creating a cross sectional flow area 128 of 6,586 mm$^2$. Four auxiliary air apertures (140 or 144), each having a diameter of 18 mm, are provided in the inner wall 94, thereby forming a total of 1017 mm$^2$, approximately 15% of the area 128.

Figure 13:
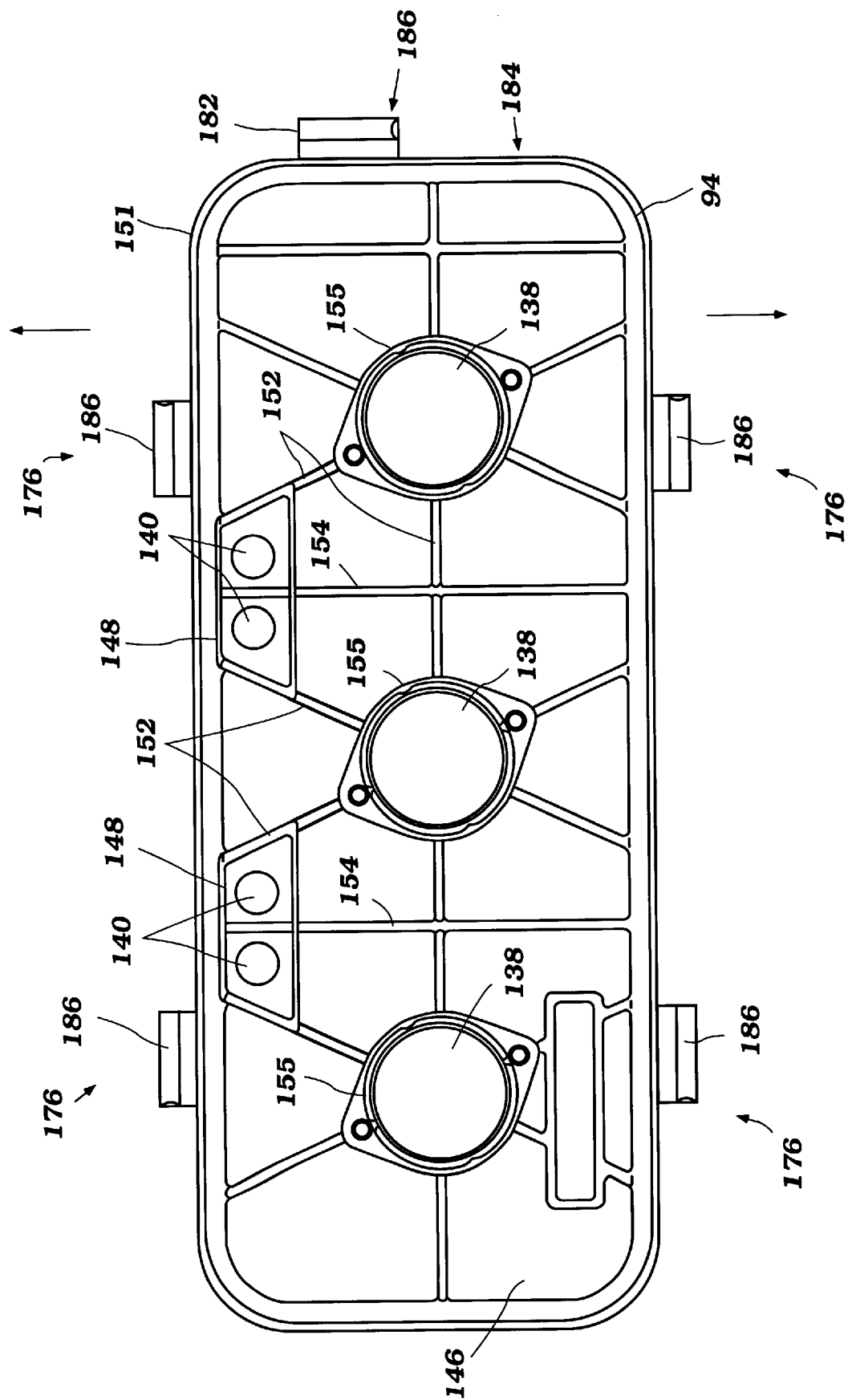
FIG. 13 is a rear elevational view of the inner wall shown in FIG. 8.
Figure 14:
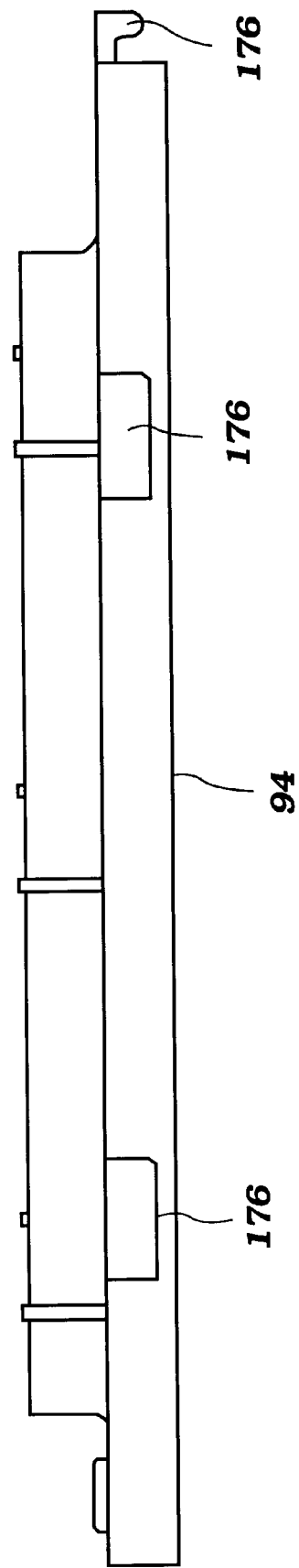
FIG. 14 is a bottom plan view of the inner wall shown in FIG. 13.

With reference to FIG. 13, an outer face 146 of the inner wall 94 includes a projection 148 arranged adjacent to each of the auxiliary air apertures 140. The projections 148 are preferably arranged above the auxiliary air apertures 140. With reference to FIG. 8, with the projections 148 formed above the auxiliary air apertures 140, water that may splash onto or otherwise inadvertently drip along an upper edge of the first intake air chamber 90, is prevented from entering the interior of the first intake air chamber 90.

Figure 12:
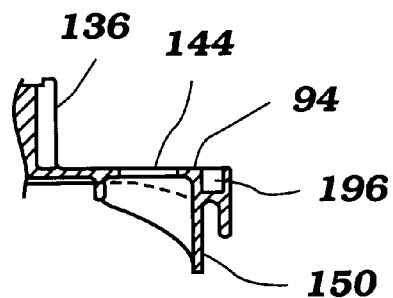
FIG. 12 a cross-sectional view taken along line 12—12 of the inner wall shown in FIG. 9

Similarly, as shown in FIGS. 9 and 12, the outer face 146 preferably includes a projection 150 formed adjacent to the auxiliary air apertures 144. As shown in FIG. 12, the projection 150 is formed below the auxiliary air apertures 144. Arranged as such, the projections 150 shield the auxiliary air apertures 144 from water that may inadvertently splash onto the auxiliary air apertures 144, thereby reducing the amount of water that may inadvertently splash into the first intake air chamber 90.

As shown in FIG. 13, the outer face 146 preferably includes a plurality of ribs 152 projecting from the outer face 146. The ribs 152 are preferably arranged so as to radiate from each intake passage 138 so as to stiffen the inner wall 94. Additionally, the outer face 146 may include ribs 154 which are arranged between each pair of intake passages 138 which also serve to stiffen the inner wall 94. Optionally, the inner wall 94 may also include a rib 151 extending from the outer face 146 and arranged along the outer periphery of the inner wall 94. The sleeves 136 also preferably include ribs 155 formed on the ends of the sleeves 136 which project from the outer face 146 of the inner wall 94.

As shown in FIG. 8, the first intake air chamber 90 is mounted to a flange 156 formed on the intake runner 96 such that each intake passage 138 is aligned with each intake runner 96. The inner wall 94 is secured to the flange 156 via a plurality of bolts 158. Preferably, the number and size of bolts 158 is sufficient to support the weight of the first intake air chamber 90.

As shown in FIG. 9, the inner face 145 of the inner wall 94 preferably includes a rib 159 surrounding the sleeves 136. The rib 159 includes a plurality bolt mounting flanges 161 which extend over a portion of the sleeves 136 to provide mounting surfaces for the bolts 158.

Figure 15:
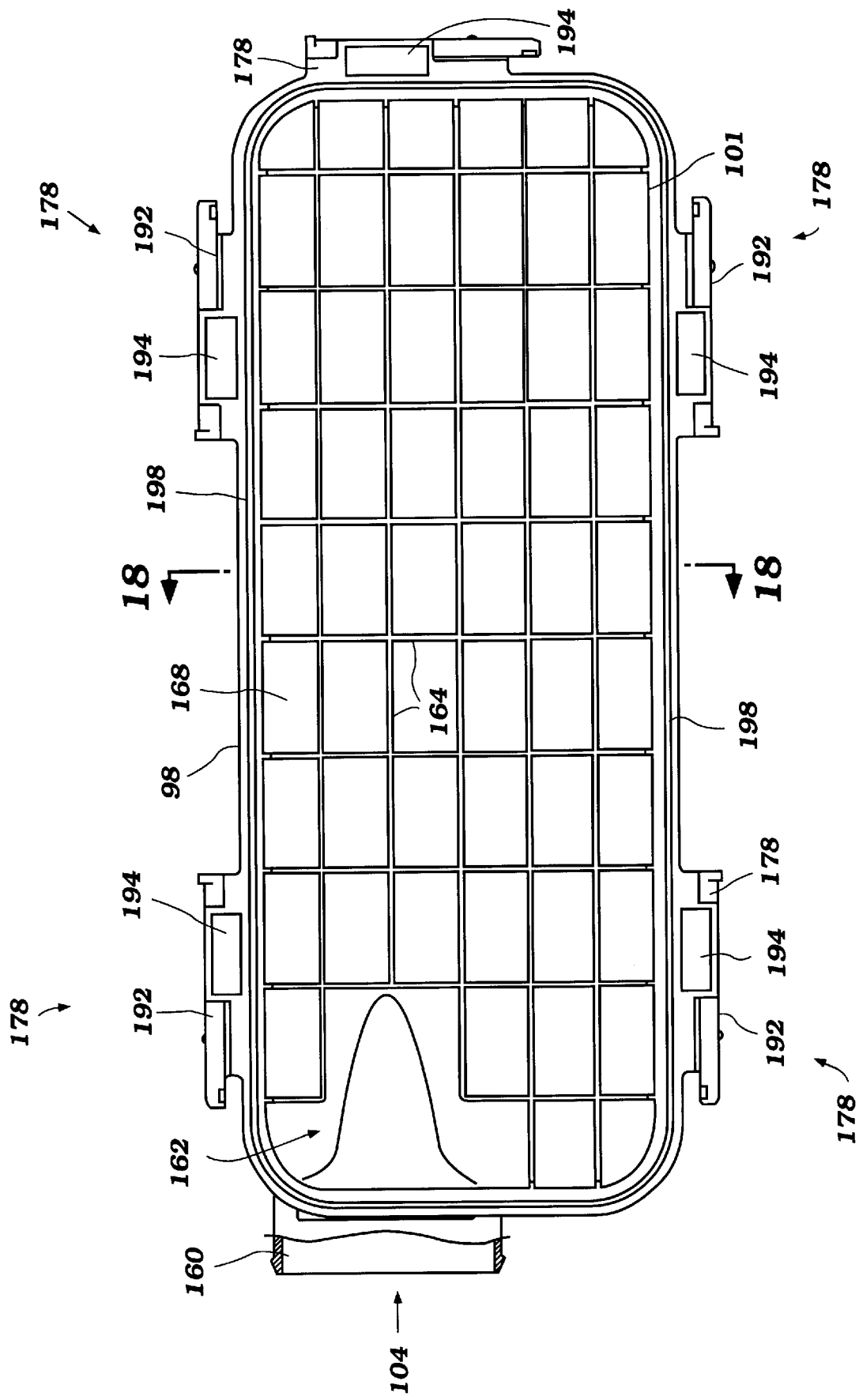
FIG. 15 is an elevational view of an inner portion of the outer cover of the intake air chamber shown in FIG. 8.
Figure 16:
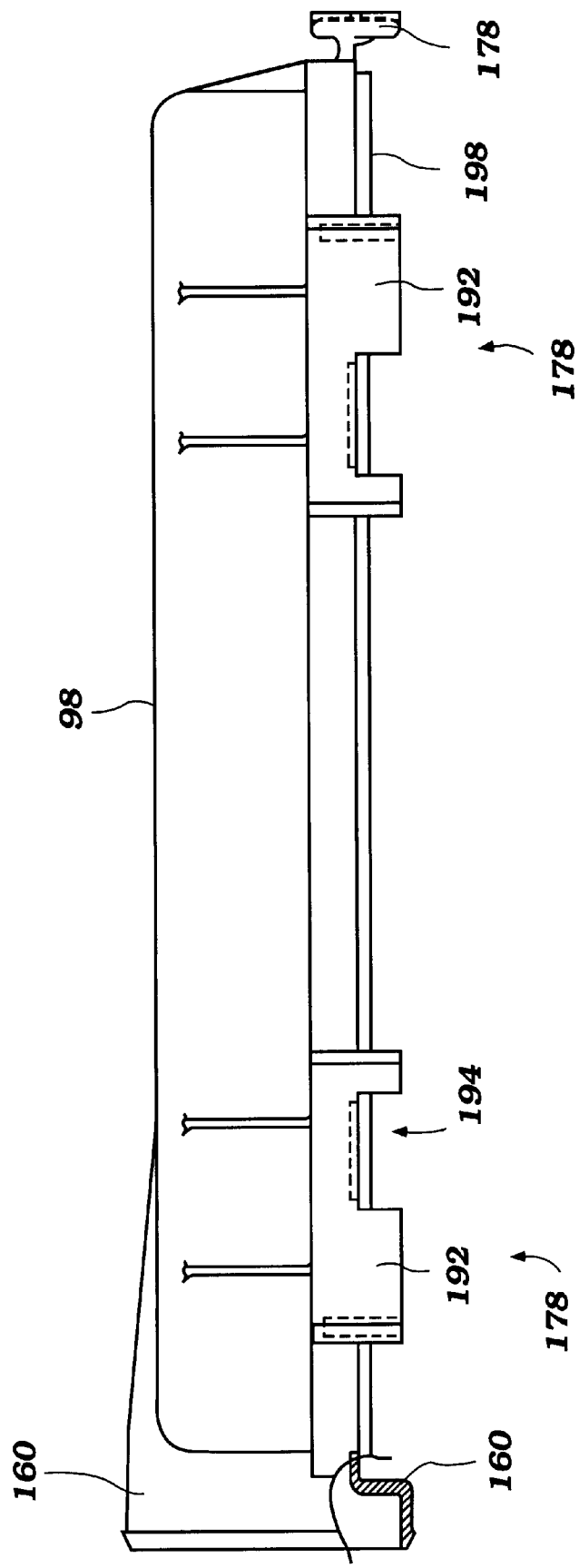
FIG. 16 is a top plan view of the outer cover shown in FIG. 15.

With reference to FIGS. 15–18, the cover member 98 preferably has a rectangular shape corresponding to the shape of the inner wall 94. As shown in FIGS. 15 and 16, the cover member 98 defines the inlet 104 of the first intake air chamber 90.

As shown in FIGS. 15 and 16, the inlet 104 is formed of an annular sleeve 160 which is configured to form a slip fit with the conduit 108. As shown in FIG. 15, the annular wall 160 is integrated with the cover member 98 so as to form a transition portion 162 where the annular shape of sleeve 160 intersects with the generally rectangular form of cover member 98.

The cover member 98 preferably includes a plurality of reinforcing ribs 164 projecting from an inner face 168 of the cover member 98. As shown in FIG. 15, the ribs 164 are arranged in a grid-like pattern. Provided as such, the ribs 164 provide a stiffening effect for the cover member 98, thereby inhibiting noise that may be generated by vibrations transferred to the first intake air chamber 90 from the engine 150, and/or induction air noise generated by the flow of air into the induction system 12.

With reference to FIG. 8, the cover member 98 is sealably engaged with the inner wall 94 via a joining portion 170. The joining portion 170 is preferably comprised of a plurality of releasable couplings 172 and a sealing device 174 disposed around the periphery of the first intake air chamber 90.

With reference to FIGS. 8 and 13–15, each of the releasable couplings 172 comprises a male portion 176 and a female portion 178. The male portions 176 and the female portions 178 are configured to mate such that a clasp member 180 is fittable over the outer contours of the male member 176 and the female member 178 when mated, as shown in FIG. 8.

With reference to FIG. 13, the male portions 176 are comprised of a projection 182 extending from a peripheral edge 184 of the inner wall 94. The projections 182 include an arcuate portion 186. As shown in FIG. 8, the arcuate portion 186 extends generally radially away from the peripheral edge 184 of the inner wall 94 and forms a generally U-shaped channel 188 having an open end 190. The open end 190 faces a direction generally normal to the inner face 168 of the inner wall 98.

As shown in FIGS. 15 and 16, the female portion 178 includes a boss section 192 and a recess 194. The boss section 192 generally corresponds in shape to the outer profile of the arcuate section 186. The recess portion 194 is configured to receive the male portion 176 such that the arcuate portion 186 generally aligns with the boss section 192. As shown in FIG. 8, when the male portion 176 is mated with the female portion 178, the C-shaped clasp 180 can be fitted over the male and female portions so as to secure the male portion 176 in a mated position with the female portion 178. Preferably, the outer contours of the male and female portions 176, 178 are configured so as to allow the clasp portion to be slid over one end thereof. As shown in FIG. 8, with the clasp secured to the male and female portions 176, 178, the cover member 98 can be fixed to the inner wall 94.

Figure 19:
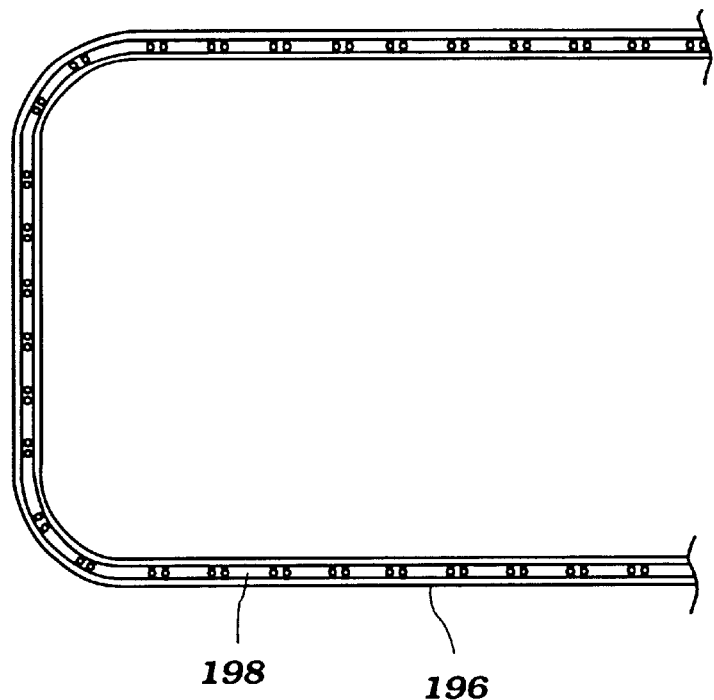
FIG. 19 is an enlarged partial elevational view of a sealing groove between the outer cover and the inner wall of an air box in accordance with the preferred embodiment of the present invention.
Figure 20:
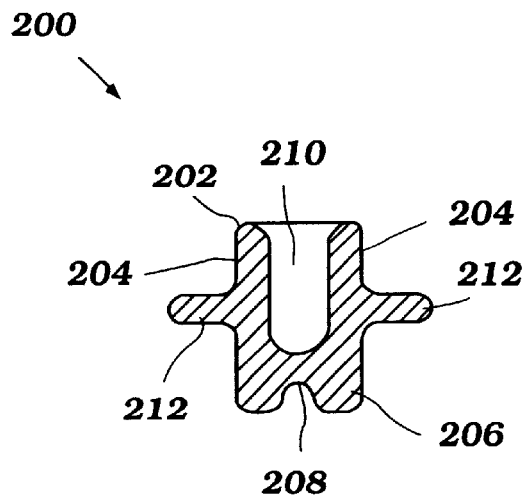
FIG. 20 is a cross-sectional view of a sealing member for use in the sealing grooves shown in FIG. 19.

With reference to FIG. 19, the sealing device 174 is comprised of a rib 198 formed along the periphery of the cover member 98 and a groove 196 formed along a corresponding periphery of the inner wall 94. However, the groove 196 could be formed on either the cover member 98 or the inner wall 94 with the rib being formed on the other.

The sealing device 174 also includes a gasket 200. The gasket 200 preferably includes a body 202 having a generally H-shaped cross section defining a pair of substantially parallel walls 204. The parallel walls 204 connected near a lower end 206 by a cross member portion 208 so as to form a gasket groove 210. Additionally, the gasket 200 preferably includes a pair of ribs 212 extending along a longitudinal length of the gasket 200. Preferably, the ribs 212, in a relaxed state, define a width of the gasket 200 that is greater than the width of the groove 196.

Figure 21:
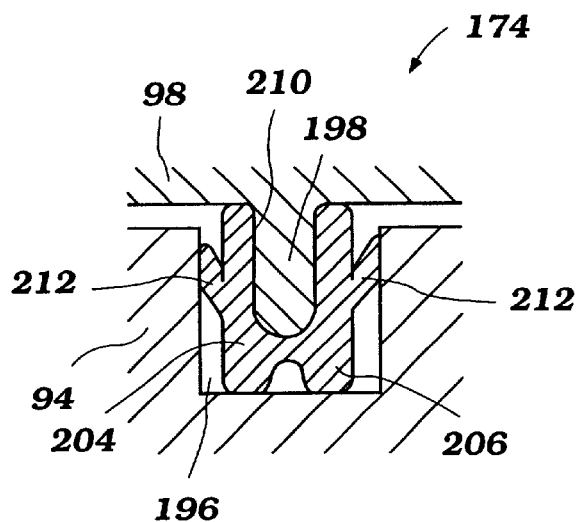
FIG. 21 is a cross-sectional view of the sealing member shown in FIG. 20 mounted in a sealing groove shown in FIG. 19.

Constructed as such, the gasket 200 is configured to provide a substantially airtight seal between the cover member 98 and the inner wall 94 of the first intake air chamber 90. As shown in FIG. 21, when the gasket 200 is installed within the groove 196, the rib members 212 deflect elastically so as to form a seal with the groove walls 196. Additionally, as shown in FIG. 21, with the rib 198 mated with the gasket groove 210, the space between the parallel walls 204 is maintained so as to maintain the rib members 212 in contact with the inside walls of the groove 196. As such, the gasket 200 maintains a substantially airtight seal between the cover member 98 and the inner wall 94 of the first intake air chamber 90.

As shown in FIG. 8, with the gasket 200 and the releasable couplings 172 arranged as such around the periphery of the first intake air chamber 90, the first intake air chamber forms a substantially airtight chamber which receives combustion air from inlet 104 and from at least one of the auxiliary air apertures 140 and/or 144.

The at least one auxiliary air aperture 140 or 144 allows an auxiliary flow of air to enter the first intake air chamber 90 during periods of sudden acceleration. For example, when the engine 50 of the watercraft 10 is idling, and the throttle is suddenly moved to a wide open position, the flow of air into the engine 50 through the intake runners 96 is rapidly increased. It has been found that intake air chambers of small watercraft tend to cause a transient delay or hesitation in the acceleration of the flow of air into the intake air chambers. This transient delay causes a delay before the engine can achieve an air flow rate required for the fuel air ratio needed for maximum engine output. Thus, acceleration of the watercraft has been delayed by the time required for the air flow to accelerate to the proper rate.

By providing the first intake air chamber with at least one auxiliary air aperture 140 and/or 144, however, an auxiliary flow of air can enter the first intake air chamber 90 at the moment when the throttle of the engine 50 is suddenly moved to a wide open position. The engine 50 therefore can reach the fuel air ratio corresponding to the maximum power output of the engine more quickly than known watercraft engines.

As described above with reference to FIG. 7, the first intake air chamber 90 preferably includes a plurality of auxiliary air apertures 140 and/or 144. At least one auxiliary air aperture 140 and/or 144 preferably is arranged between each pair of intake runners 96. Arranged as such, the auxiliary air apertures 140 and/or 144 provide auxiliary flows of air that are evenly distributed between the intake runners 96. It has been found that two auxiliary air apertures 140 or 144 are arranged between each intake runner 96 is optimal.

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. An engine induction system for a watercraft comprised of a hull defining an engine compartment, an internal combustion engine having a plurality of intake runners communicating with a plurality of combustion chambers and being supported within the engine compartment, and a propulsion device supported by the hull and driven by the engine to propel the watercraft, the induction system comprising a first intake air chamber having a plurality of walls defining an interior volume and having an air inlet, the first intake air chamber including a plurality of induction apertures communicating with the plurality of intake runners, a second intake air chamber having an air inlet and an air outlet, the air inlet of the first intake air chamber communicating with the air outlet of the second intake air chamber, and at least one auxiliary air aperture formed in at least one of the plurality of walls.

2. An engine induction system as set forth in claim 1 additionally comprising a first cross sectional air flow area defined in the induction system upstream from the first intake air chamber, the at least one auxiliary air aperture defining a total cross sectional air flow area into the first intake air chamber that is from 5–25% of the first cross sectional air flow area.

3. An engine induction system as set forth in claim 2, wherein the total cross sectional air flow area of the at least one auxiliary air aperture is from 10–20% of the first cross sectional air flow area.

4. An engine induction system as set forth in claim 3, wherein the total cross sectional air flow area of the at least one auxiliary air aperture is approximately 15% of the first cross sectional air flow area.

5. An engine induction system as set forth in claim 2 additionally comprising a conduit through which the air inlet of the first intake air chamber communicates with the air outlet of the second intake air chamber, the conduit defining the first cross sectional air flow area at a minimum cross sectional passage formed in the conduit.

6. An engine induction system as set forth in claim 1, wherein the plurality of walls includes at least one inner wall formed between the interior of the first intake air chamber and the engine, the at least one auxiliary air aperture being formed in the inner wall.

7. An engine induction system as set forth in claim 6, wherein the at least one auxiliary air aperture is arranged in an upper portion of the inner wall.

8. An engine induction system as set forth in claim 6, wherein the plurality of induction apertures are formed on the inner wall.

9. An engine induction system as set forth in claim 8, wherein the at least one auxiliary air aperture is arranged between at least one pair of the induction apertures.

10. An engine induction system as set forth in claim 9, wherein the at least one auxiliary air aperture comprises at least a pair of auxiliary air apertures formed between each pair of induction apertures.

11. An engine induction system as set forth in claim 8, wherein the at least one auxiliary air aperture is formed on a portion of the wall above the induction apertures.

12. An engine induction system as set forth in claim 1, wherein the at least one auxiliary air aperture connects the first intake air chamber to a space formed between the first intake air chamber and the engine.

13. An engine induction system for a watercraft comprised of a hull defining an engine compartment, an internal combustion engine having at least one combustion chamber and being supported within the engine compartment, and a propulsion device supported by the hull and driven by the engine to propel the watercraft, the induction system comprising a first intake air chamber having a plurality of walls defining an interior volume and having an air inlet, the first intake air chamber communicating with at least one combustion chamber via an induction aperture, a second intake air chamber having an air inlet and an air outlet, the air inlet of the first intake air chamber communicating with the air outlet of the second air intake air chamber, at least one auxiliary air aperture formed in at least one of the plurality of walls and an exhaust conduit communicating with the at least one combustion chamber and extending over the first intake air chamber.

14. An engine induction system as set forth in claim 1 additionally comprising at least one fuel charge former positioned between at least one of the induction apertures and the engine, and an exhaust conduit extending above the at least one fuel charge former.

15. An engine induction system as set forth in claim 1 additionally comprising a conduit through which the air inlet of the first intake air chamber communicates with the air outlet of the second intake air chamber, the first intake air chamber defining a first cross-sectional flow area, and the conduit defining a second cross-sectional flow area being smaller than the first cross-sectional flow area.

16. An engine induction system according to claim 15, wherein the at least one auxiliary air aperture defines a cross-sectional air flow area smaller than the first cross-sectional flow area.

17. An engine induction system according to claim 1 additionally comprising a projection formed adjacent the at least one auxiliary air aperture and being configured to shield the at least one auxiliary air aperture from splashing water.

18. An engine induction system for a watercraft comprised of a hull defining an engine compartment, an internal combustion engine having a plurality of intake runners communicating with a plurality of combustion chambers and being supported within the engine compartment, a propulsion device supported by the hull and driven by the engine to propel the watercraft, and a fuel tank supported by the hull, the induction system comprising a first intake air chamber having a plurality of walls defining an interior volume and having an air inlet, the first intake air chamber including a plurality of induction apertures communicating with the plurality of intake runners, a second intake air chamber having an air inlet and an air outlet, the air inlet of the first intake air chamber communicating with the air outlet of the second intake air chamber, and means for allowing an auxiliary flow of air to flow into the first intake air chamber.

19. An engine induction system according to claim 18 additionally comprising means for shielding the means for allowing from splashing water.

20. An engine induction system according to claim 18 additionally comprising at least one projection formed adjacent the means for allowing, the projection being configured to shield the means for allowing from splashing water.

21. An engine induction system as set forth in claim 18, wherein the plurality of walls includes at least one inner wall formed between the interior of the first intake air chamber and the engine, the means for allowing being formed in the inner wall.

22. An engine induction system as set forth in claim 21, wherein the means for allowing is arranged in an upper portion of the inner wall.

23. An engine induction system as set forth in claim 21, wherein the plurality of induction apertures are formed on the inner wall.

24. An engine induction system as set forth in claim 23, wherein the means for allowing is arranged between at least one pair of the induction apertures.

25. An engine induction system as set forth in claim 18 additionally comprising an exhaust conduit communicating with the combustion chambers and extending over the first intake air chamber, the means for allowing being positioned below the exhaust conduit.

26. An engine induction system as set forth in claim 25, wherein the plurality of walls includes at least one inner wall formed between the interior of the first intake air chamber and the engine, the means for allowing being formed in the inner wall.

27. An engine induction system for a watercraft comprised of a hull defining an engine compartment, an internal combustion engine having at least one combustion chamber and being supported within the engine compartment, and a propulsion device supported by the hull and driven by the engine to propel the watercraft, the induction system comprising a first intake air chamber having a plurality of walls defining an interior volume and having an air inlet, the first intake air chamber communicating with the at least one combustion chamber and having at least one auxiliary air aperture formed in at least one of the plurality of walls, a second intake air chamber having an air inlet and an air outlet, the air inlet of the first intake air chamber communicating with the air outlet of the second intake air chamber via a conduit, the second intake air chamber being disposed remotely from the first air intake chamber, wherein the first intake air chamber is disposed on a first side of the engine, the second intake air chamber being disposed on a second side of the engine.

28. The induction system according to claim 27, wherein the first side is a lateral side, the second side being a longitudinal end.

29. The induction system according to claim 27, wherein the first and second intake air chambers are separated from each other by the conduit.

* * * * *

Disclaimer 6,312,299—Yasuhiko Henmi, Iwata, Japan. INDUCTION SYSTEM FOR WATERCRAFT ENGINE. Patent dated November 6, 2001. Disclaimer filed April 8, 2003 by assignee, Yamaha Hatsudoki Kabushiki Kaisha.

Herby enters this disclaimer to claims 1-29 of said patent.

*(Official Gazette, July 15, 2003)*